(12) United States Patent
Peedikakkandy et al.

(10) Patent No.: US 10,960,715 B2
(45) Date of Patent: Mar. 30, 2021

(54) VARIABLE INSTALLATION ANGLE TYRE PRESSURE MONITORING SYSTEM

(71) Applicant: APOLLO TYRES LTD., Tamil Nadu (IN)

(72) Inventors: Prithviraj Peedikakkandy, Kerala (IN); Sethuramalingam Anbuchezhian, Tamil Nadu (IN)

(73) Assignee: Apollo Tyres Ltd., Tamil Nadu (IN)

( * ) Notice: Subject to any disclaimer, the term of this patent is extended or adjusted under 35 U.S.C. 154(b) by 92 days.

(21) Appl. No.: 16/345,006

(22) PCT Filed: Oct. 27, 2017

(86) PCT No.: PCT/IB2017/056688
§ 371 (c)(1),
(2) Date: Apr. 25, 2019

(87) PCT Pub. No.: WO2018/078576
PCT Pub. Date: May 3, 2018

(65) Prior Publication Data
US 2019/0270351 A1  Sep. 5, 2019

(30) Foreign Application Priority Data
Oct. 28, 2016 (IN) .............................. 201641037034

(51) Int. Cl.
*B60C 23/04* (2006.01)
*B60C 29/02* (2006.01)

(52) U.S. Cl.
CPC .......... *B60C 29/02* (2013.01); *B60C 23/0494* (2013.01)

(58) Field of Classification Search
CPC .. G01M 17/02; G01M 17/021; G01M 17/022; G01M 17/027; G01M 17/025;
(Continued)

(56) References Cited

U.S. PATENT DOCUMENTS 6,952,955 B1 * 10/2005 Uleski ................. B60C 23/0408
73/146
2008/0121032 A1 * 5/2008 Qiu ..................... B60C 23/0494
73/146.8
(Continued)

FOREIGN PATENT DOCUMENTS

CN          101890885 A        11/2010
CN          202186246           4/2012
(Continued)

OTHER PUBLICATIONS

PCT International Search Report and Written Opinion of the International Searching Authority for corresponding PCT Application No. PCT/IB2017/056688 dated Oct. 27, 2017.

*Primary Examiner* — Andre J Allen
(74) *Attorney, Agent, or Firm* — Renner, Otto, Boisselle & Sklar, LLP

(57) ABSTRACT

An assembly comprising a tyre valve (2) and an enclosure (3), wherein the enclosure (3) is adapted to receive a gas pressure monitoring unit, wherein the enclosure (3) comprises a hinge joint, the hinge joint having at least one stationary member connected to the enclosure (3), an axle (6) and a rotatable member (4) arranged to at least partially rotate around the axle (6) and wherein the tyre valve (2) is connected to the rotatable member (5) of the hinge joint. The tyre valve (2) is connected to the rotatable member (4) of the hinge joint by a form-fitting connection which secures the tyre valve (2) against movement in a direction towards the rotatable member (4) and in a direction away from the rotatable member (5).

8 Claims, 5 Drawing Sheets

Figure 1:
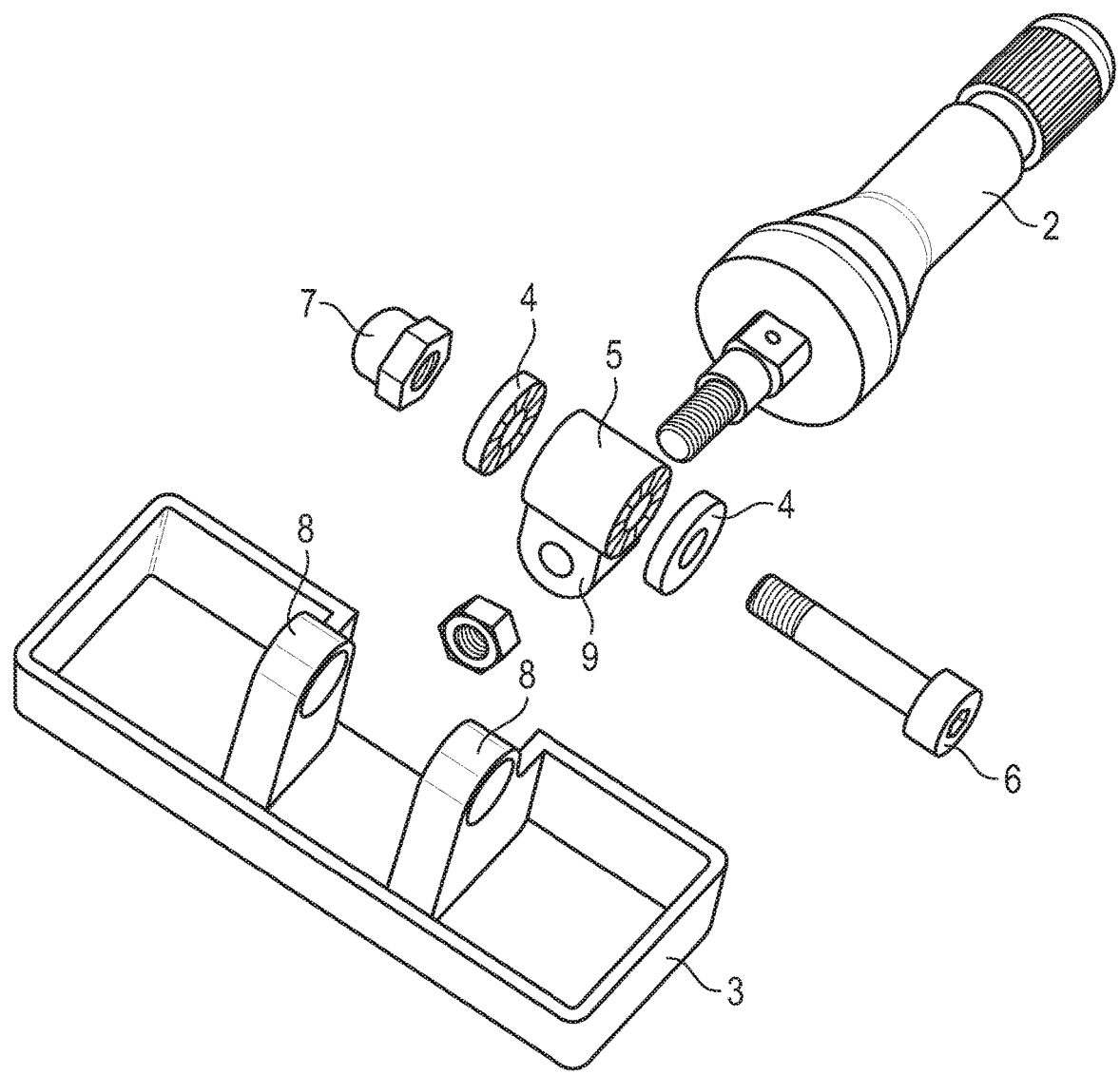

(58) Field of Classification Search
CPC ...... G01M 17/024; G01M 17/10; G01M 7/08;
G01M 17/0076; G01M 17/013; G01M
17/03; G01M 17/04; G01M 17/06; G01M
17/08; G01M 1/02; G01M 1/045; G01M
1/12; G01M 1/225; G01M 3/04; G01M
3/40; G01M 5/0091; G01M 7/02; G01M
99/00; G01M 99/002; B60C 23/0494;
B60C 2019/004; B60C 23/0493; B60C
23/064; B60C 19/00; B60C 23/04; B60C
23/0488; B60C 23/0498; B60C 23/0496;
B60C 23/0408; B60C 23/041; B60C
23/0411; B60C 23/06; B60C 23/20; B60C
11/246; B60C 23/0486; B60C 23/061;
B60C 11/243; B60C 99/00; B60C
11/0083; B60C 13/003; B60C 2009/2038;
B60C 23/004; B60C 23/02; B60C
23/0401; B60C 23/0406; B60C 23/0416;
B60C 23/0433; B60C 23/0455; B60C
23/0459; B60C 23/0474; B60C 23/0489;
B60C 23/0491; B60C 25/002; B60C
25/005; B60C 25/007; B60C 29/02; B60C
3/04; B60C 99/006; B60C 11/0332; B60C
11/24; B60C 13/001; B60C 13/02; B60C
15/0036; B60C 17/02; B60C 2009/0071;
B60C 2009/2022; B60C 2200/02; B60C
2200/06; B60C 2200/065; B60C 23/00;
B60C 23/001; B60C 23/003; B60C
23/007; B60C 23/008; B60C 23/0413;
B60C 23/0427; B60C 23/0447; B60C
23/0454; B60C 23/0457; B60C 23/0462;
B60C 23/0471; B60C 23/0472; B60C
23/0476; B60C 23/0479; B60C 23/0484;
B60C 23/065; B60C 23/066; B60C 23/10;
B60C 25/0548; B60C 25/056; B60C
25/132; B60C 25/138; B60C 29/005;
B60C 9/005; B60C 9/18; B60C 9/1807;
B60C 9/20; B60C 9/28
USPC .................................................. 73/146–146.8
See application file for complete search history.

(56) References Cited

U.S. PATENT DOCUMENTS

| | | | |
|---|---|---|---|
| 2008/0127724 A1* | 6/2008 | Qiu | B60C 23/0494 73/146.8 |
| 2008/0250852 A1* | 10/2008 | Capdepon | B60C 23/0494 73/146.8 |
| 2012/0017672 A1 | 1/2012 | Uh et al. | |
| 2015/0090024 A1* | 4/2015 | Huang | B60C 23/0498 73/146.3 |
| 2015/0090025 A1* | 4/2015 | Huang | B60C 23/0494 73/146.8 |
| 2017/0267038 A1 | 9/2017 | Li et al. | |
| 2020/0039301 A1* | 2/2020 | McClurg | B60C 23/0494 |

FOREIGN PATENT DOCUMENTS

| | | |
|---|---|---|
| CN | 103317980 A | 9/2013 |
| CN | 105196806 | 12/2015 |
| EP | 2857228 B1 | 2/2016 |
| GB | 2407383 | 4/2005 |

\* cited by examiner

VARIABLE INSTALLATION ANGLE TYRE PRESSURE MONITORING SYSTEM

This application is a national phase entry of International Application No. PCT/IB2017/056688 filed on Oct. 27, 2017 and published in the English language, which claims priority to Application No. 201641037034 filed on Oct. 28, 2016, both of which are hereby incorporated by reference.

The present invention relates to an assembly comprising a tyre valve and an enclosure, wherein the enclosure is adapted to receive a gas pressure monitoring unit, wherein the enclosure comprises a hinge joint, the hinge joint having at least one stationary member connected to the enclosure, an axle and a rotatable member arranged to at least partially rotate around the axle and wherein the tyre valve is connected to the rotatable member of the hinge joint. The invention also relates to a tyre wheel comprising an assembly according to the invention.

Vehicle safety and reliability are central aspects of automotive technology. Therefore, for safety-related reasons alone, the tyre pressure of motor vehicles should be regularly monitored which, however, is often neglected by the driver. For this reason, an increasing number of modern vehicles are equipped with detecting means in the form of tyre pressure sensors, which measure the pressure in the tyres automatically and transmit it to an on-board control device. In this way, accidents or defects resulting from low tyre pressure should be avoided. Such automatic measuring of the tyre pressure makes it possible to detect early and indicate to the driver when the tyre pressure critically deviates from a tyre pressure nominal value, thus making a manual inspection unnecessary. In such systems for automatic measuring of the tyre pressure, one tyre pressure sensor is arranged, respectively, on each tyre or pneumatic tyre. At the same time, a tyre pressure sensor often comprises at least one sensor for detecting the tyre pressure or the temperature, as well as one transmission unit and, if required, one electronic evaluation unit, which can also be on-board.

Most of the tyre pressure monitoring systems (TPMS) available on the market use directly measuring pressure sensors that are assigned to the valve and transmit the tyre pressure value measured by the pressure sensor by way of an electronic system of the wheel equipped with a transmission antenna to a receiving device in the vehicle, which then in turn indicates the measured value by way of the electronic system of the vehicle and, if it is below a prescribed value, possibly triggers a warning signal.

For example, EP 2 857 228 A1 discloses a tyre pressure sensor installed on a tyre rim, the tyre rim comprising an assembly through hole; the tyre pressure sensor comprising: a sensor body, comprising: a gas nozzle assembly hole; a tyre pressure sensing module disposed in the sensor body for detecting a tyre pressure, including a control unit which saves a firmware for controlling operation of the tyre pressure sensing module; and an update connection port electrically connecting to the tyre pressure sensing module, wherein the control unit receives an update firmware data through the update connection port for updating the firmware; a gas intake nozzle, comprising: a coupling section inserted into the gas nozzle assembly hole; and a gas intake section connecting to the coupling section, penetrating through the assembly through hole, and extending towards a direction outside the tyre rim for gas to input; and a gas nozzle assembly member, penetrating through the gas nozzle assembly hole to couple with the gas intake nozzle. Such a tyre pressure sensor can only be affixed in one particular angle on the rim. An attempt to affix the sensor in different angles may result in damage that leads to improper functioning of the sensor.

A tyre monitoring sensor comprises two main parts: valve and sensor. In use, the tyre pressure monitoring sensor is mounted at the position of the tyre valve which is mounted on the rim. Since the valve onto the rim mounting surface and the vertical direction has a mounting angle subtended, for tyres of different specifications the installation angle of the valve on the rim angle is different. That is to say, tyres of different specifications, installation of the valve on the rim angle is different. Hence, a tyre monitoring sensor with a fixed angle between the sensor housing and the valve can only be mounted to a specific rim type only. If mounted to a different rim, this can cause damage to and subsequent failure of the sensor housing while mounting and demounting of tyre.

Numerous attempts have been made in the prior art to provide tyre pressure monitoring systems with variable angles between the valve and the sensor or the sensor housing. CN 202186246 U relates to a tyre pressure monitoring sensor with an adjustable installation angle, comprising a sensor shell and an inflating valve, wherein the sensor shell is movably connected with the inflating valve through a movement pair; the movement pair comprises an inflating valve connector and a pin; a bracket is arranged on the top part of the sensor shell; the bracket is movably connected with the inflating valve connector through the pin, and the inflating valve connector is fixedly connected with one end of the inflating valve. An included angle between the sensor shell and the inflating valve can be adjustable and fixed at any position from −90 to 90 degrees so that the tyre pressure monitoring sensor is reported to be suitable for automobile tyres with different types of rims and can better avoid failure risk caused by improper installation angle. The drawback of the solution as disclosed in this Chinese utility model is that the valve is merely slid onto the valve connector without any form-fitting fastening arrangements. This necessitates additional measures to secure the assembly to prevent a separation of the valve and the sensor shell.

US 2012/017672 A1 discloses a tyre pressure sensor comprising: a tyre pressure sensor housing installed on a side portion of a wheel to sense air pressure of a tyre; an angle-adjustable tyre valve coupled to the tyre pressure sensor housing, having an end exposed out of the wheel through a wheel valve hole, and including a male screw part on a middle outer surface; a rubber grommet disposed on an inner surface corresponding to the wheel valve hole to prevent air from leaking out of the tyre;a washer fitted on the tyre valve to support the rubber grommet; and a fastening nut coupled to the male screw part of the tyre valve. The construction as disclosed in this patent application has the disadvantage that the extent to which the valve can be angled with respect to the sensor housing is fairly limited.

The present invention has the object of at least partially overcoming the drawbacks of the prior art. In particular, the present invention has the object of providing a tyre pressure monitoring system where the valve is securely fastened to the housing and where the angle between valve and housing can be set to large angles.

This object is achieved by an assembly comprising a tyre valve and an enclosure as described herein. A tyre wheel comprising an assembly according to the invention is also described herein. Advantageous embodiments of the invention are further described herein. They can be combined freely unless the context clearly indicates otherwise.

The tyre valve is rotatably coupled to the enclosure and, for example, has a freedom of rotating at an angle that allows it to be fixed on rims for tyres with different profiles.

The invention will be further described with reference to the following figures without wishing to be limited by them.

Figure 2:
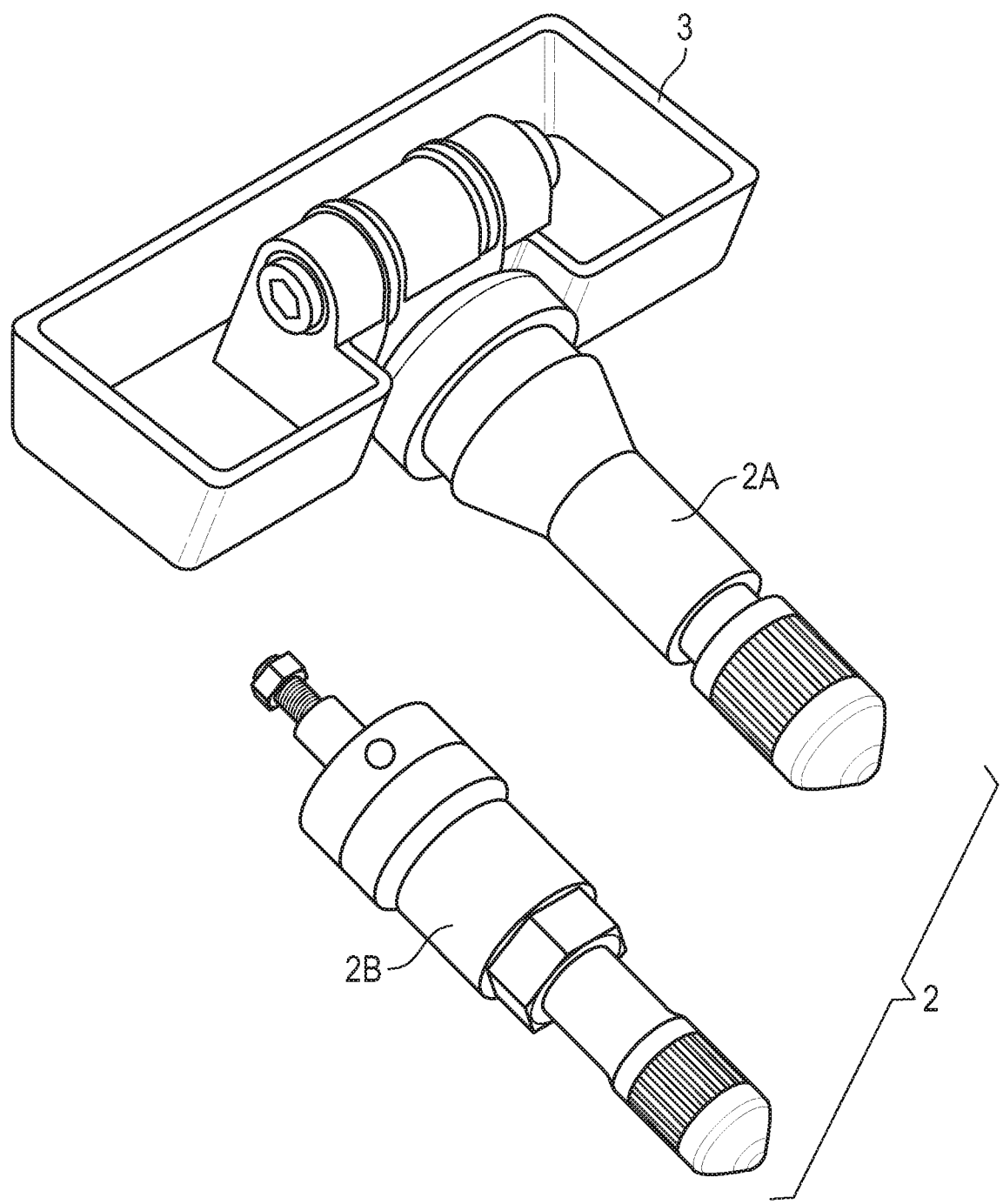
Figure 3:
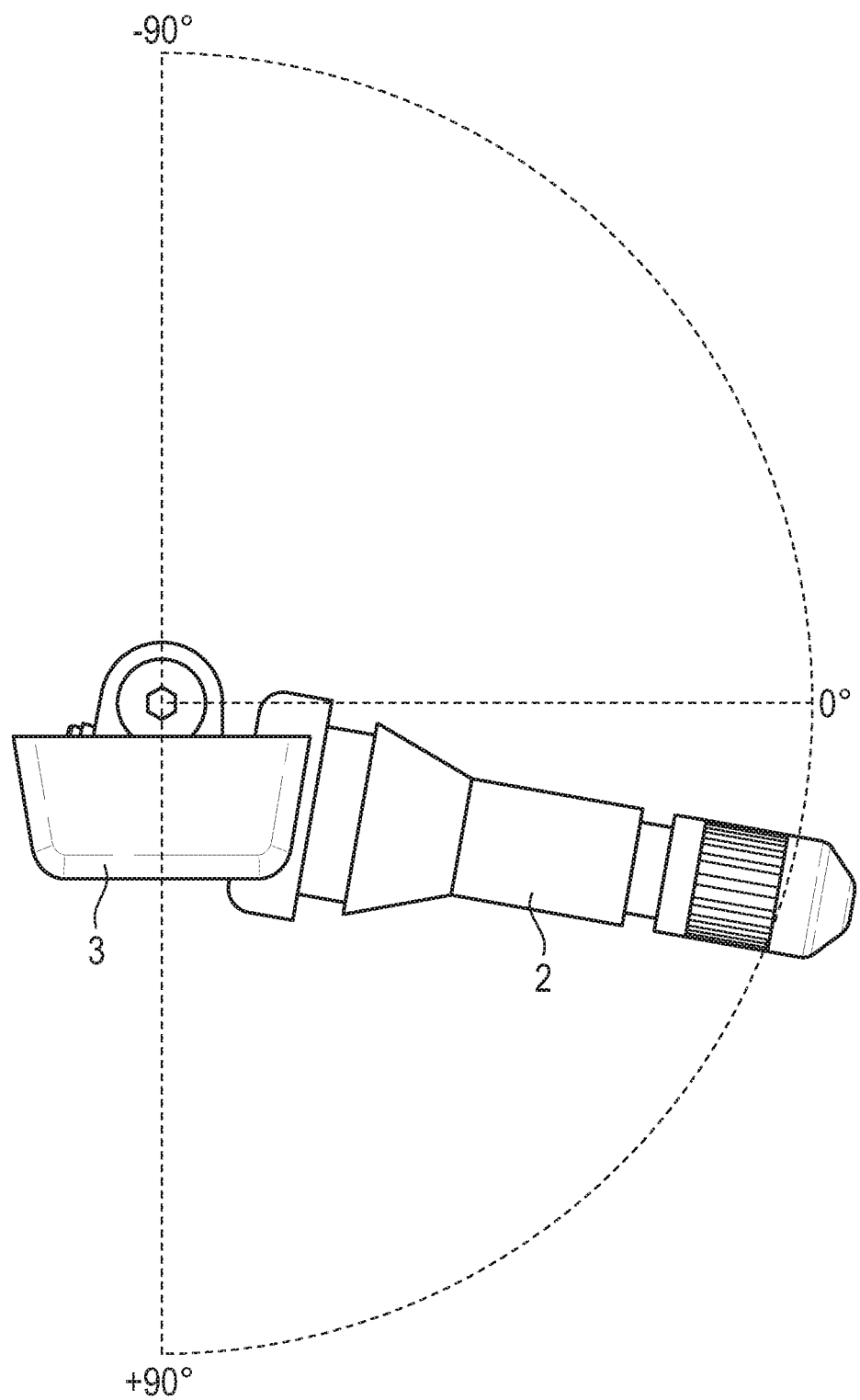
Figure 4:
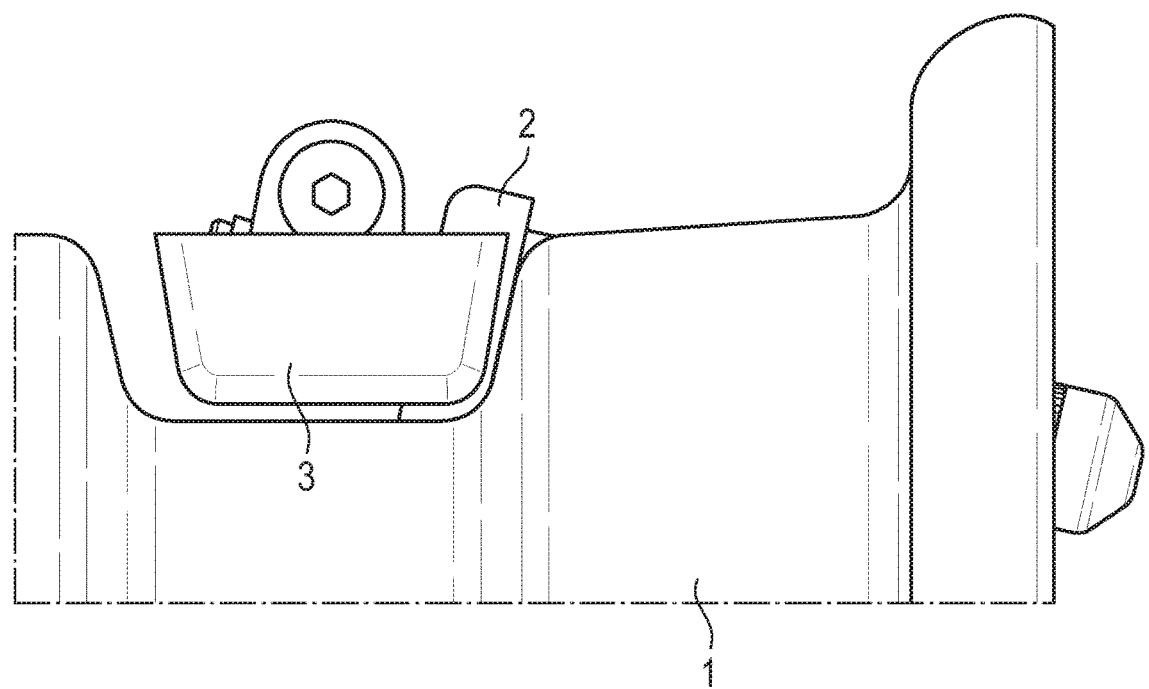
Figure 5:
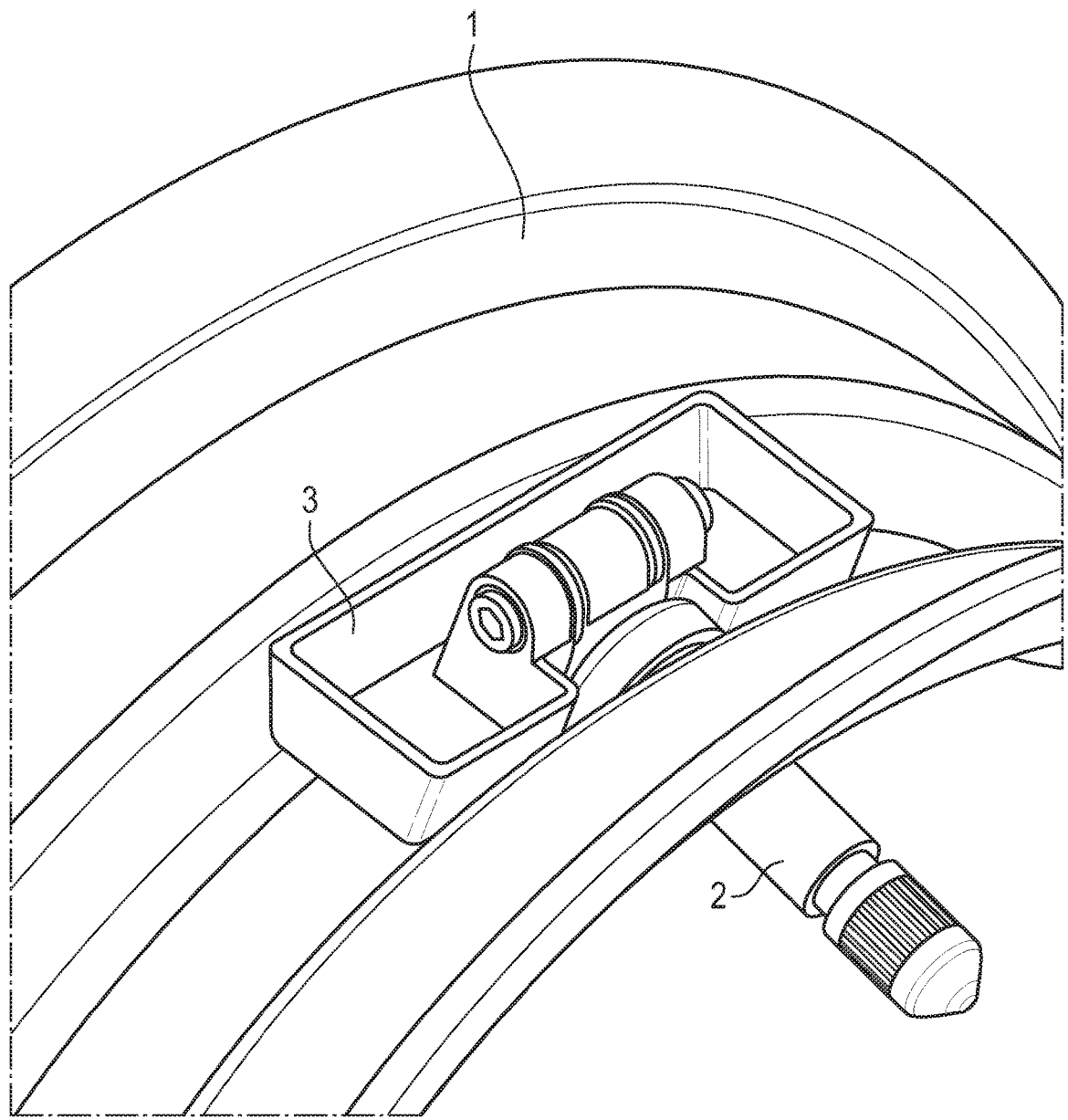

FIG. 1 shows an exploded view of an assembly comprising a tyre valve and an enclosure according to the invention FIG. 2 shows an assembly comprising a tyre valve and an enclosure according to the invention FIG. 3 shows an assembly comprising a tyre valve and an enclosure according to the invention FIG. 4 shows an assembly comprising a tyre valve and an enclosure according to the invention mounted onto a tyre rim FIG. 5 shows an assembly comprising a tyre valve and an enclosure according to the invention mounted onto a tyre rim Referring to FIG. 1, an assembly comprising a tyre valve 2 and an enclosure 3 according to the invention is shown. A suitable tyre valve 2 may, for example, be a valve for automobile tyres, truck tyres or tractor tyres. The enclosure 3 is adapted to receive a gas pressure monitoring unit. Then the enclosure 3 can act as a carrier for the monitoring unit. The enclosure 3 may be an open enclosure as depicted in FIG. 1, a partially sealed enclosure or a sealed enclosure (provided that the gas pressure monitoring unit can still fulfill its function).

The enclosure 3 comprises a hinge joint, the hinge joint having at least one stationary member connected to the enclosure 3, an axle 6 and a rotatable member 5 arranged to at least partially rotate around the axle. In the enclosure 3 depicted in FIG. 1 the hinge joint comprises two stationary members and an axle 6. The hinge joint's rotatable member 5, is sandwiched between two washers 4, which may be serrated washers, when assembled in order to ensure a snug fit of the member 5. These components not only performs the function of holding the enclosure 3 to the tyre valve 2 but also arresting the freedom of rotation of the enclosure with respect to the valve at any desired angle.

According to the invention the tyre valve 2 is connected to the rotatable member 5 of the hinge joint. In particular, the tyre valve 2 is connected to the rotatable member 5 of the hinge joint by a form-fitting connection which secures the tyre valve 2 against movement in a direction towards the rotatable member 5 and in a direction away from the rotatable member 5. Hence the tyre valve 2 cannot move along an axis perpendicular to the axle of the hinge joint, even if a force is applied in the respective directions. Preferably the tyre valve 2 is immobilized with respect to its connection to the rotatable member 5 even in the presence of a force. It is further preferred that the form-fitting connection is a releasable connection to allow easy fitting of the assembly into a tyre wheel. Examples for suitable form-fitting connections are screw connections and bayonet connections.

In an embodiment of the assembly according to the invention the rotatable member 5 of the hinge joint comprises an extension to which the tyre valve is connected. This extension is also depicted in the assembly of FIG. 1. The extension creates an offset from the axis defined by the axle 6 of the hinge joint and introduces a greater flexibility for the possible range of motion for the tyre valve 2 with respect to the housing 3.

In another embodiment of the assembly according to the invention the tyre valve 2 has an at least partially threaded extension which is fastened to the rotatable member 5 of the hinge joint.

In another embodiment of the assembly according to the invention the at least partially threaded extension of the tyre valve 2 is screwed into a thread provided by the rotatable member 5 of the hinge joint.

In another embodiment of the assembly according to the invention the least partially threaded extension of the tyre valve 2 is fastened to the rotatable member 5 of the hinge joint via a threaded nut. This is depicted in FIG. 1 where a threaded extension of the valve 2 reaches through the extension of the rotatable member and is secured on the opposing side by a threaded nut.

In another embodiment of the assembly according to the invention the axle 6 of the hinge joint is an at least partially threaded bolt. This is depicted in FIG. 1 where a torque nut 7 is used to secure the axle 6 in the hinge joint.

FIG. 2 shows a perspective view of an assembly according to the invention with enclosure 3 and a tyre valve. The tyre valve connected to the enclosure 3 is designated 2A whereas an unconnected tyre valve of a slightly different exterior configuration with a nut at the end of the threaded extension is designated 2B.

In another embodiment of the assembly according to the invention the enclosure 3 comprises a recess adapted to increase the range of motion of the valve 2. For example, as shown in FIG. 3, an angular range of −90 to +90 degrees can be realized. This allows the assembly to be affixed onto tyre rims with vastly different profiles and can avoid failure risk due to an improper installation angle while mounting and demounting of tyre.

In another embodiment the assembly according to the invention further comprises a gas pressure monitoring unit within the enclosure 3. This unit may comprise a printed circuit board, sensor, battery and other electronic parts for sensing the gas pressure and temperature inside the tyre.

In another embodiment of the assembly according to the invention the gas pressure monitoring unit comprises radio transmission circuitry in electrical communication with the valve 2 and the valve 2 acts as an antenna of the radio transmission circuitry. The valve 2 acting as an antenna may connected to the transmission circuitry by means of a feeder.

The invention is further directed to a tyre wheel 1 comprising an assembly according to the invention. FIG. 4 and FIG. 5 show such configurations in a side view and a perspective view.

The invention claimed is:

1. An assembly comprising a tyre valve and an enclosure, wherein the enclosure is adapted to receive a gas pressure monitoring unit,
wherein the enclosure comprises a hinge joint, the hinge joint having at least one stationary member connected to the enclosure, an axle and a rotatable member arranged to at least partially rotate around the axle,
wherein the tyre valve is connected to the rotatable member of the hinge joint,
wherein the tyre valve is connected to the rotatable member of the hinge joint by a form-fitting connection which secures the tyre valve against movement in a direction towards the rotatable member and in a direction away from the rotatable member, and wherein the rotatable member of the hinge joint comprises an extension to which the tyre valve is connected, and wherein the tyre valve has an at least partially threaded extension which is fastened to the rotatable member of the hinge joint.

2. The assembly according to claim 1, wherein the at least partially threaded extension of the tyre valve is screwed into a thread provided by the rotatable member of the hinge joint.

3. The assembly according to claim 1, wherein the least partially threaded extension of the tyre valve is fastened to the rotatable member of the hinge joint via a threaded nut.

4. The assembly according to claim 1, wherein the axle of the hinge joint is an at least partially threaded bolt.

5. The assembly according to claim 1, wherein the enclosure comprises a recess adapted to increase the range of motion of the valve.

6. The assembly according to claim 1, further comprising a gas pressure monitoring unit within the enclosure.

7. The assembly according to claim 6, wherein the gas pressure monitoring unit comprises radio transmission circuitry in electrical communication with the valve and wherein the valve acts as an antenna of the radio transmission circuitry.

8. A tyre wheel comprising an assembly according to claim 1, and a tyre onto which the assembly is mounted.

\* \* \* \* \*